United States Patent
McDiarmid et al.

(10) Patent No.: US 9,294,998 B2
(45) Date of Patent: Mar. 22, 2016

(54) OPTIMIZED RESOURCE MANAGEMENT IN MULTI-RADIO ACCESS TECHNOLOGY DEVICES

(71) Applicant: T-Mobile USA, Inc., Bellevue, WA (US)

(72) Inventors: Mark McDiarmid, Bellevue, WA (US); Pablo Tapia, Bellevue, WA (US); Hongliang Zhang, Samammish, WA (US)

(73) Assignee: T-MOBILE USA, INC., Bellevue, WA (US)

(*) Notice: Subject to any disclaimer, the term of this patent is extended or adjusted under 35 U.S.C. 154(b) by 511 days.

(21) Appl. No.: 13/674,760

(22) Filed: Nov. 12, 2012

(65) Prior Publication Data
US 2014/0133375 A1    May 15, 2014

(51) Int. Cl.
*H04W 52/02* (2009.01)

(52) U.S. Cl.
CPC ...... *H04W 52/0225* (2013.01); *H04W 52/0229* (2013.01); *Y02B 60/50* (2013.01)

(58) Field of Classification Search
None
See application file for complete search history.

(56) References Cited

U.S. PATENT DOCUMENTS

| 8,305,958 B2 | 11/2012 | Iyer et al. | |
| 2006/0285601 A1* | 12/2006 | Julian et al. | 375/260 |
| 2007/0030857 A1 | 2/2007 | Fulknier et al. | |
| 2009/0017850 A1 | 1/2009 | Jovicic et al. | |
| 2011/0103363 A1* | 5/2011 | Bennett | 370/338 |

FOREIGN PATENT DOCUMENTS

| WO | WO 2010/088295 | 5/2010 | |
| WO | WO 2010088295 A1 * | 8/2010 | H04W 28/24 |

OTHER PUBLICATIONS

International Search Report and Written Opinion mailed Apr. 18, 2014, International Application No. PCT/US2013/069505, filed Nov. 11, 2013.

* cited by examiner

*Primary Examiner* — Nicholas Sloms
(74) *Attorney, Agent, or Firm* — Knobbe, Martens, Olson & Bear, LLP

(57) ABSTRACT

Methods and systems are described herein for adaptively adjusting the power level of a wireless transceiver and a cellular transceiver in a telecommunications device to correspond to the usage and data throughput of the device. The device can also dynamically enter different modes of operation based at least in part on network activity data usage on a wireless data network provided by the telecommunications device. By controlling the power levels, the power usage of the device can be reduced in order to increase efficiency of battery usage.

17 Claims, 5 Drawing Sheets

OPTIMIZED RESOURCE MANAGEMENT IN MULTI-RADIO ACCESS TECHNOLOGY DEVICES

BACKGROUND

Mobile telecommunications devices and other personal computing mobile devices are powered by batteries. Battery life is determined by both the hardware and software components of a mobile device. Further, mobile devices are capable of an increasing range of functionalities that consume significant mobile device and network resources. As this trend continues, providing sufficient battery life can be an increasingly difficult problem to solve.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
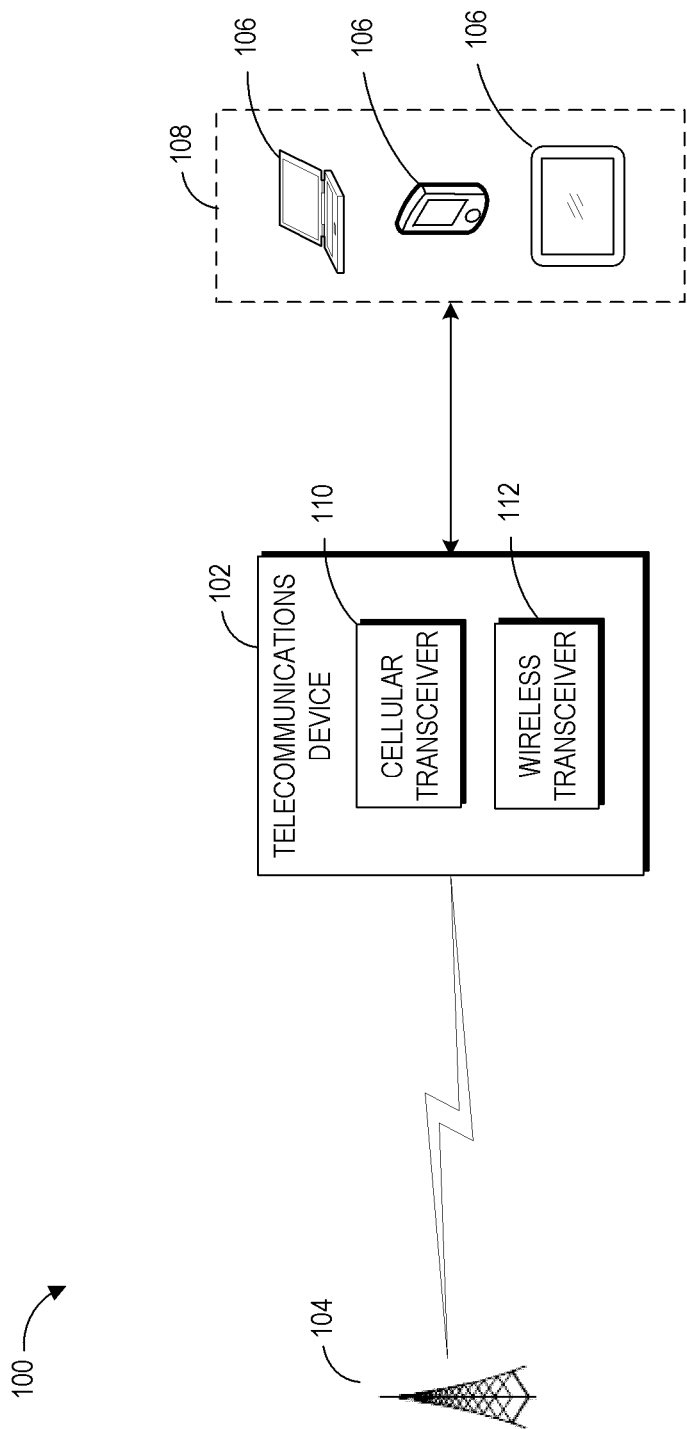
FIG. 1 is a block diagram depicting an illustrative telecommunications device communication environment.

The disclosure relates to optimizing resource management in mobile telecommunications devices to improve battery life without substantially diminishing performance. The telecommunications devices can combine cellular and wireless technologies into a single device. The telecommunications devices may communicate over a cellular network and have large range mobility and access to communication networks such as the Internet. The telecommunications device can provide Internet access via a cellular connection as backhaul to a group of client devices, such as smart phones, laptops, tablet computers, vehicle computers, and other wireless capable electronic devices. The cellular and wireless hardware can consume large amounts of power because the hardware may constantly be in use and transmitting at full power.

Accordingly, a method and system are described herein for adaptively adjusting the power level of a wireless transceiver and a cellular transceiver in a telecommunications device to correspond to the usage and data throughput of the device. The device can also dynamically enter different modes of operation based at least in part on network activity data usage on a wireless data network provided by the telecommunications device. By controlling the power levels, the power usage of the device can be reduced in order to increase efficiency of battery usage.

In one embodiment the disclosure provides a computer-implemented method for power management. The computer-implemented method includes communicating, by a mobile device, with a client device via a wireless data network. Access to the wireless data network is provided by the mobile device and the mobile device has a wireless transceiver and a cellular transceiver. The method can also include determining a cellular condition of the mobile device. The method can also include determining a wireless communication network data rate for the mobile device based at least in part on the cellular condition. The method can also include determining a wireless data network data rate of the client device communicating with the mobile device via the wireless data network. The method can also include determining a target power level for at least one of the wireless transceiver and the cellular transceiver of the mobile device based at least in part on the wireless communication network data rate and the wireless data network data rate. The method can also include adjusting a power level of at least one of the wireless transceiver and the cellular transceiver to the target power level.

In some embodiments the power levels of both the wireless transceiver and the cellular transceiver are adjusted. The wireless communication network data rate can be a predictive data rate. The wireless communication network data rate can be based at least in part on time of day. The wireless communication network data rate can be based at least in part on a movement speed of the mobile device. The cellular condition can be a channel quality index. The cellular condition can be a fading index. The wireless communication network data rate can be an uplink data rate. The wireless communication network data rate can be a downlink data rate.

In some embodiment the computer-implemented method can further include detecting a change in the wireless data network data rate and adjusting the power level of at least one of the wireless transceiver and the cellular transceiver to account for the change.

In some embodiments the method can include detecting a change in the wireless communication network data rate, and adjusting the power level of at least one of the wireless transceiver and the cellular transceiver to account for the change.

In an embodiment of a mobile telecommunications device, the device has a cellular transceiver, a wireless transceiver, and a processing unit. The cellular transceiver can be configured to communicate with a cellular network. The wireless transceiver can be configured to provide a wireless data network. The processing unit is in communication with memory and a network interface. The processing unit can be configured to communicate, over the wireless data network, with a client device via the network interface. The processing unit can be further configured to determine a cellular condition and determine a wireless communication network data rate based at least in part on the cellular condition. The processing unit can be further configured to determine a wireless network data rate of the client device. The processing unit can be further configured to determine a target power level for at least one of the wireless transceiver and the cellular transceiver based at least in part on the wireless communication network data rate and the wireless data network data rate. The processing unit can be further configured to cause adjustment of the power level of at least one of the wireless transceiver and the cellular transceiver to the target power level.

In some embodiments the mobile telecommunications device is battery powered. The processing unit can be configured to cause adjustment of the power level of the wireless transceiver and/or the cellular transceiver to conserve battery life. The wireless data network can be a wireless data network based on the family of IEEE 802.11 technical standards. The processing unit can be configured to cause an increase in the power level of the wireless transceiver and/or the cellular transceiver. The processing unit can be configured to cause a decrease in the power level of the wireless transceiver and/or the cellular transceiver.

In another embodiment of a computer-implemented method for managing power, the computer-implemented method includes broadcasting, by a wireless access point device, a beacon signal to indicate the presence of a wireless access point. The method also includes providing, by the wireless access point device, a client device with access to a wireless data network. The method also includes monitoring, by the wireless access point device, network activity on the wireless network. The method also includes adjusting the wireless access point device between a first mode and a second mode based on activity of the user device on the wireless network. The method also includes broadcasting, by the wireless access point device, the beacon signal using a first beacon signal transmission protocol when the wireless access point device is in a first mode. The method also includes broadcasting, by the wireless access point device, the beacon signal using a second beacon signal transmission protocol when the wireless access point device is in a second mode.

In some embodiments the second beacon signal transmission protocol has a greater interval between beacon signal broadcasts than the first beacon signal transmission protocol. The wireless access point device can be a mobile phone. The wireless access point device can be battery powered.

In some embodiments the method also includes adjusting a power level of a cellular transceiver of the wireless access point device when the wireless access point device is in sleep mode. In some embodiments the method also includes deactivating a cellular transceiver of the wireless access point device when the wireless access point device is in the second mode. In some embodiments the method also includes broadcasting, by the wireless access point device, the beacon signal using a third beacon signal transmission protocol when the wireless access point device is in a third mode.

Although aspects of the present disclosure will be described with regard to an illustrative telecommunication environment, device interactions, communication protocols and flow diagrams, one skilled in the relevant art will appreciate that the disclosed embodiments are illustrative in nature and should not be construed as limiting. The systems and methods in the present disclosure may be utilized in conjunction with various communication protocols. Additionally, although the term telecommunications device is used in this document, the term represents any type of device having a component for communicating with one or more other devices via one or more communication paths. Such communication paths can include wireless communication paths (e.g., via infra-red, RF, optical, cellular, terrestrial, and/or satellite communication media) and/or wired communication paths (e.g., local area networks, wide area networks, private networks, enterprise networks, public networks, and or the Internet). Still further, although the present disclosure references a telecommunications device, one skilled in the relevant art will appreciate that a telecommunications device may also be referred to as a wireless computing device, a mobile communication device, a mobile terminal, or a computing device. Examples of telecommunications devices are described below with regard to FIGS. 1 and 2. Accordingly, reference to a telecommunications device should not be interpreted as including any particular functionality or operation not described in the present disclosure.

FIG. 1 depicts an illustrative a telecommunications device communication environment 100. The telecommunications device communication environment 100 can include a telecommunications device 102 associated with a user. The telecommunications device 102 can have a cellular transceiver 110 capable of initiating, receiving or facilitating communications over a wireless communication network 104. The telecommunications device 102 can correspond to a wide variety of devices or components including, but not limited to, personal computing devices, electronic book readers (e.g., e-book readers), hand held computing devices, integrated components or processors for inclusion in computing devices, home electronics, appliances, vehicles, machinery, landline telephones, network-based telephones (e.g., voice over IP ("VoIP")), cordless telephones, cellular telephones, smart phones, modems, personal digital assistants, laptop computers, gaming devices, media devices, and the like. In an illustrative embodiment, the telecommunications device 102 includes a wide variety of software and hardware components, such as the cellular transceiver 110, for establishing communications over one or more communication networks, including a wireless communication network 104 or a wired communication network (not shown).

The telecommunications device 102 can have a wireless transceiver 112 capable of forming a wireless data network 108 between it and client devices 106 based on the family of IEEE 802.11 technical standards ("WiFi"), a wireless network based on IEEE 802.16 standards ("WiMax"), and other wireless networks. For example, telecommunications device 102 is capable of initiating, receiving or facilitating communications between one or more of client devices 106 and the wireless communication network 104. In one embodiment, the telecommunications device 102 is a mobile WiFi network provider device that provides a WiFi network for a number of client devices 106 through the wireless communication network 104. The mobile WiFi network provider device can be configured so that it does not provide other telecommunications services, such as phone calls. Illustrative components of a telecommunications device 102 will be described in greater detail with regard to FIG. 2.

The client devices 106 are wireless capable communication devices and can include, but are not limited to, personal computing devices, electronic book readers (e.g., e-book readers), hand held computing devices, integrated components or processors for inclusion in computing devices, home electronics, appliances, vehicles, machinery, landline telephones, network-based telephones (e.g., voice over IP ("VoIP")), cordless telephones, cellular telephones, smart phones, modems, personal digital assistants, laptop computers, gaming devices, media devices, and the like.

In an illustrative embodiment, the telecommunications device communication environment 100 can include a number of additional devices, systems and/or subsystems for facilitating communications with the telecommunications devices 102, or other devices. The additional devices can facilitate a wireless communication network 104, such as a cellular radio access network ("RAN"), a wireless network based on the family of IEEE 802.11 technical standards ("WiFi"), a wireless network based on IEEE 802.16 standards ("WiMax"), a converged wireless telecommunication network such as Unlicensed Mobile Access ("UMA"), or General Access Network ("GAN"), and other wireless networks. The operation of mobile communication networks, such as wireless communication network 104 are well known and will not be described in greater detail. Additionally, although the wireless communication network 104 is illustrated as a single communication network, one skilled in the relevant art will appreciate that the communication network can be made up of any number of public or private communication networks and/or network connections.

Figure 2:
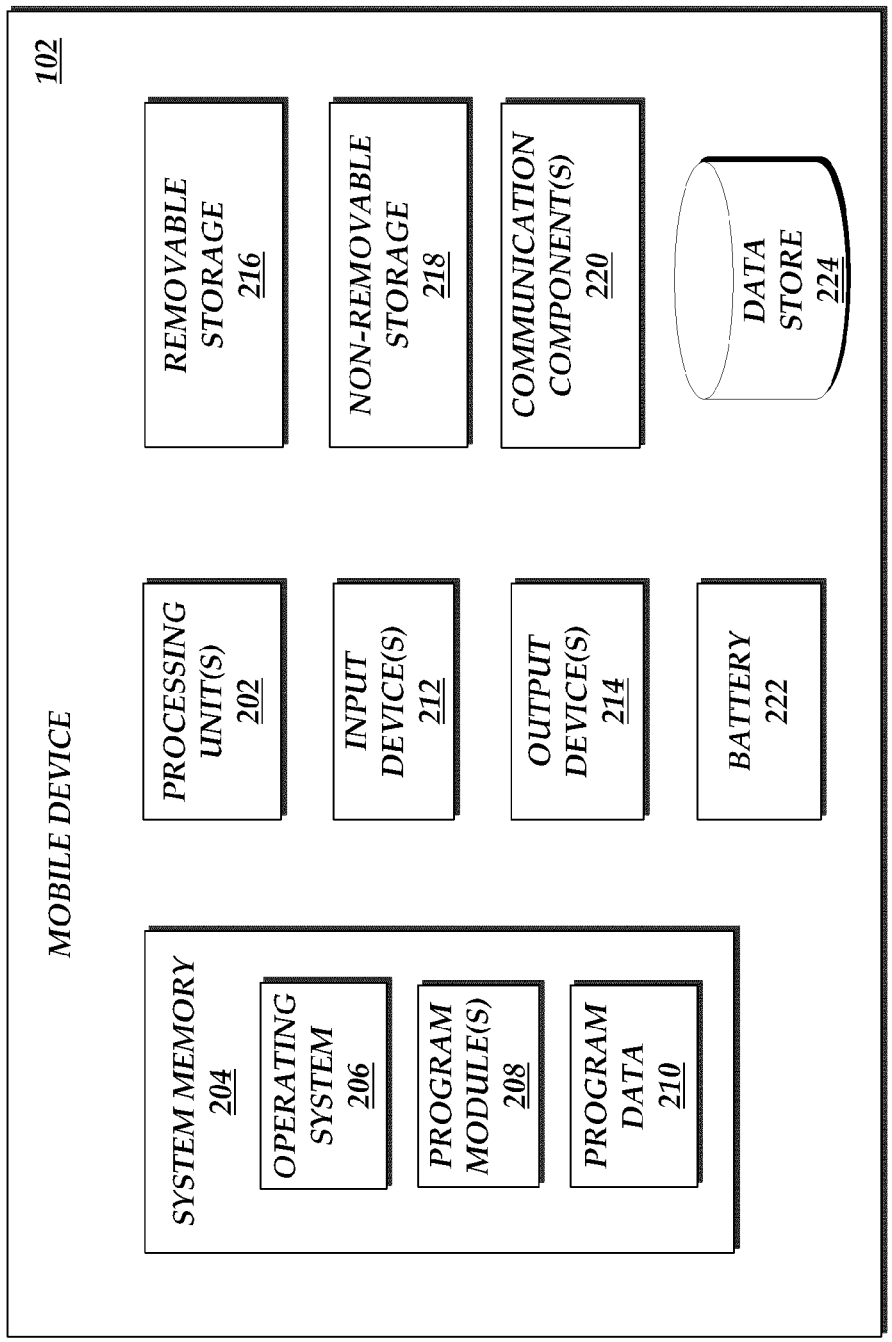
FIG. 2 is a block diagram depicting illustrative components of a telecommunications device.

FIG. 2 illustrates components of a telecommunications device 102, such as a mobile telephone. The telecommunications device 102 may include one or more processing units 202, such as one or more CPUs. The telecommunications device 102 may also include system memory 204, which may correspond to any combination of volatile and/or non-volatile computer-readable storage media. The system memory 204 may store information which provides an operating system module 206, various program modules 208, program data 210, and other modules. The above-enumerated list of modules is representative and is not exhaustive of the types of functions performed, or modules implemented, by the telecommunications device 102. The telecommunications device 102 performs functions by using the processing unit(s) 202 to execute modules stored in the system memory 204. The telecommunications device 102 may also include one or more input devices 212 (keyboard, mouse device, specialized selection keys, etc.) and one or more output devices 214 (displays, printers, audio output mechanisms, etc.). One skilled in the relevant art will appreciate that additional or alternative software modules and/or hardware components may also be included in the telecommunications device 102 to carry out other intended functions such as mobile telephone functions.

With continued reference to FIG. 2, the telecommunications device 102 may also include a battery 222, one or more types of removable storage 216, and one or more types of non-removable storage 218. In some embodiments the device can be connected to an external power source, such as an AC power outlet. Still further, the telecommunications device 102 can include communication components 220, such as a cellular transceiver and a wireless transceiver, for facilitating communication via wired and wireless communication networks, such as the wireless communication network 104 and wireless data network 108 (FIG. 1). These transceivers facilitate such communication using various communication protocols including, but not limited to, Bluetooth, the family of IEEE 802.11 technical standards ("WiFi"), the IEEE 802.16 standards ("WiMax), short message service ("SMS"), voice over IP ("VoIP") as well as various generation cellular air interface protocols (including, but not limited to, air interface protocols based on code division multiplex access (CDMA), time division multiple access (TDMA), global system for mobile communications (GSM), wireband code division multiplex access (WCDMA), code division multiplex access $3^{rd}$ generation (CDMA2000), time division synchronous code division multiple access (TD-SCDMA), wavelength and time division multiple access (WTDMA), long term evolution (LTE), orthogonal frequency division multiple access (OFDMA), and similar technologies).

Figure 3:
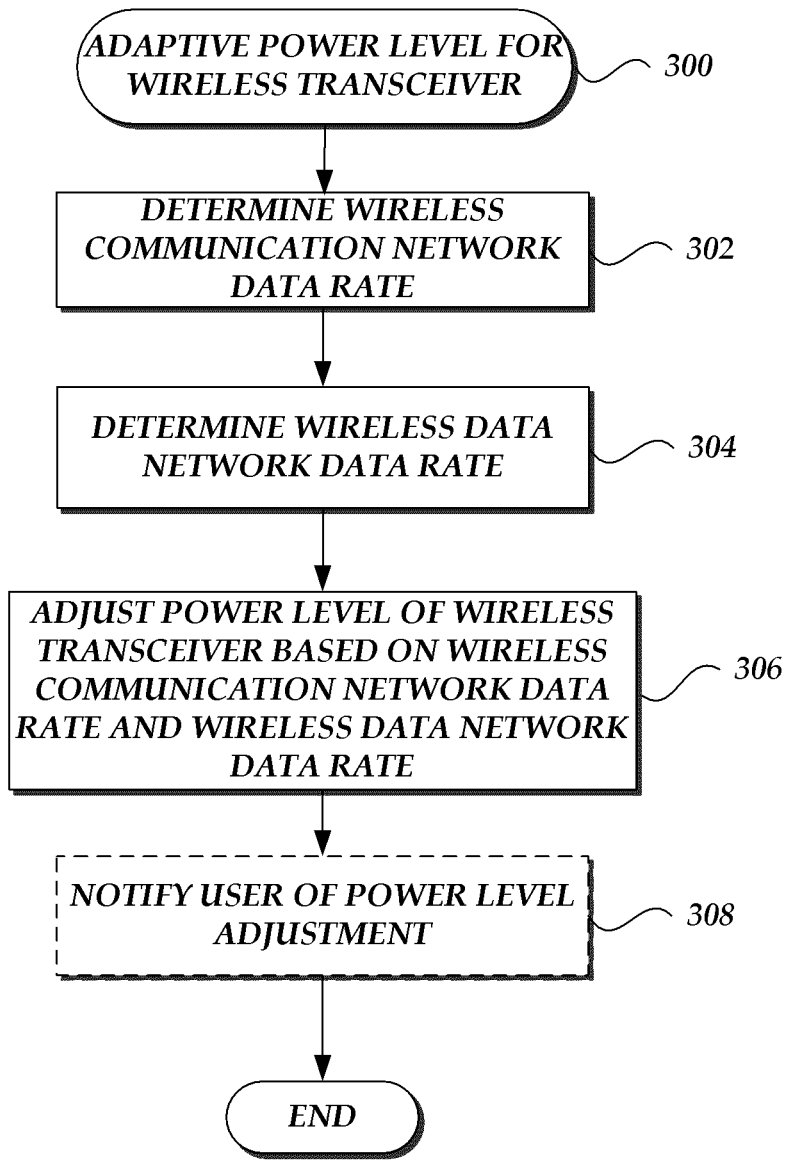
FIG. 3 is a flow diagram depicting an illustrative routine for adapting a power level for a wireless transceiver in a mobile device.

FIG. 3 is a flow diagram depicting an illustrative routine 300 for adapting a power level for a wireless transceiver in a mobile device. One skilled in the relevant art will appreciate that routine 300 may be implemented by one or more program modules 208 executed by the processing unit 202 of a telecommunications device 102. Accordingly, the routine 300 has been logically associated as being generally performed by the processing unit 202, and thus the following illustrative embodiments would not be considered as limiting.

At block 302, the processing unit 202 processes the operating conditions of the wireless communications network ("WCN") 104 and determines a WCN data rate for a wireless access point. The wireless access point can be a telecommunications device 102, such as a mobile cellular phone or mobile wireless access point device, and can be battery powered. As noted above, the telecommunications device 102 may have a cellular transceiver that is operable to communicate with the wireless communication network 104. The telecommunications device 102 may also have a wireless transceiver that is operable to provide a wireless data network ("WDN") 108 between the telecommunications device and the client devices 106. Thus, the telecommunications device 102 can function as a wireless data network access point or hub for client devices 106. The client devices 106 can include personal computing devices, electronic book readers (e.g., e-book readers), hand held computing devices, and the like. The client devices 106 are wireless capable communication devices.

The client devices 106 are capable of connecting to the wireless data network 108. The client devices 106 communicate wirelessly with the telecommunications device 102 using various wireless communication protocols, including WiFi, Bluetooth, and/or other communication protocols. In one embodiment the telecommunications device 102 provides a WiFi wireless data network 108 using IEEE 802.11 protocol standards. Client device communications on the wireless data network 108 are routed through the telecommunications device 102 to the wireless communication network 104. In some embodiments the wireless data network 108 provided by the telecommunications device 102 can have a limited number of client devices 106 connected or client devices 106 at a given time. For example, in one embodiment, the telecommunications device 102 can have a limit of five client devices 106 connected to the wireless data network 108.

The quality of communication between the wireless communications network 104 and the telecommunications device 102 can be assessed and analyzed by a plurality of network communication characteristics. Network communication characteristics can include a channel quality index (CQI), a fading index, delay, jitter, carrier-to-interference ratio, receiver power, and other characteristics. The processing unit 202 of the telecommunications device 102 can use the network communication characteristics to determine WCN operating conditions of the wireless communications network 104.

The WCN operating conditions can be used to derive a WCN data rate, also referred to as WCN bandwidth or WCN throughput, between the wireless communications network 104 and the telecommunications device 102. The WCN data rate can refer to an uplink data rate, a down link data rate, or other data rate associated with communications between the wireless communication network 104 and the telecommunications device 102. The WCN data rate can be a predictive data rate, a current data rate, a maximum data rate, an average data rate, or other type of data rate. The processing unit 202 uses the WCN operating conditions to determine the WCN data rate between the telecommunications device 102 and the wireless communication network 104. The processing unit 202 can analyze the WCN operating conditions using one or more algorithms to determine the WCN data rate. The WCN data rate can factor in historical data and current data. In some embodiments, the processing unit 202 can use a feedback loop to adjust the WCN data rate. In some embodiments, the processing unit 202 can use thresholds that help determine the WCN data rate.

In some embodiments the WCN data rate can be a predictive data rate and can be determined with the help of geographic and time-based information, such as user activity characteristics (e.g., peak user times), number of active devices in the same geographic location, speed and direction that the device is travelling (e.g., driving, walking, etc.), and the like. For example, the predictive data rate can be adjusted according to the speed the telecommunications device 102 is travelling. Illustratively, the data rate tends to decrease as speed increases.

The WCN data rate can be a single value, a range of values, a threshold level, or other indication of data rate. For example, in one instance, the WCN data rate can be 5 mbps. The WCN data rate represents the effective maximum data rate between the telecommunications device 102 and wireless communication network 104.

The processing unit 202 can update the WCN data rate using various methods, including periodic updates, threshold-based updates, event-based updates, user specified updates, and/or a combination of methods. Periodic updates to the WCN data rate can be at a specific frequency, such as every 100 milliseconds, every second, every five seconds, or other frequency. The threshold-based updates can be based at least in part on changes to the WCN conditions, geographic positioning, or other changes to characteristics monitored by the processing unit 202. The event-based thresholds can include events such as a handoff from one node to another on the wireless communications network 104. The processing unit 202 can update the WCN data rate when one or more conditions satisfied as determined by the processing unit 202.

Communications over the wireless data network 108 is limited by data rates between the telecommunications device 102 and the wireless communication network 104. As such, the data rate of the wireless data network 108 is less than or equal to the WCN data rate. By determining the WCN data rate, the processing unit 202 can determine whether the wireless transceiver is operating at a power level that takes into account the WCN data rate. The processing unit 202 can then factor in the WCN data rate to adjust the operational power level of the wireless transceiver to improve battery life of the telecommunications device 102.

At block 304, the processing unit 202 determines a WDN data rate. The processing unit 202 can also determine the data rate for each client device 106 connected to the wireless data network 108. The processing unit 202 can determine the WDN data rate based at least in part on various WDN characteristics. The WDN characteristics can include the number of connected client devices 106, the types of client devices 106, the applications and processes being run on the client devices 106, the data usage of each client devices 106, historical data usage, and the like. The processing unit 202 can use the WDN characteristics to determine the WDN data rate. The processing unit 202 can use one or more algorithms, thresholds, or other methods to determine the WDN data rate based at least in part on the WDN characteristics. The processing unit 202 can determine maximum data rates, minimum data rates, average data rates, and other data rate based information. The data rate information can be factored into an algorithm to determine the WDN data rate. The WDN data rate can be a predictive data rate, an average data rate, a maximum data rate, or other determined data rate. The WDN data rate can be a single value, a range of values, a threshold level, or other indication of data rate. For example, in one instance, the WDN data rate can be 5 mbps. The WDN data rate can represent the aggregate data rate between the client devices 106 and the telecommunications device 102.

At block 306, the processing unit 202 adjusts the power level of the wireless transceiver based at least in part on the WCN data rate and the WDN data rate. The wireless throughput may be a function of signal to noise ration (SNR), which is directly linked to transmit power of the wireless transceiver. As such the power level of the wireless transceiver can be used to adjust the effective WDN data rate. The effective WDN data rate determines the maximum data rate at which data can be transferred from the client devices 106 to the telecommunications device 102. For each power level, the wireless transceiver has a maximum data rate. The processing unit 202 can determine the current power of the wireless transceiver and identify the data rate associated with the power level. For example, the power level and corresponding data rates can be identified using a lookup table. The resolution of the lookup table can vary. In some embodiments, the lookup table can have a very fine resolution so that the data rate can be determined within a small margin of precision based at least in part on the power level. In other embodiments, the power levels can represent a range of values. For example, one embodiments of a lookup table can associate data rates with power values at a resolution of 0.1 dB and another lookup table can associated data rates with power levels at a resolution of 1 dB. In some embodiments the processing unit 202 can determine the power level associated with a specific data rate by interpolation when there is not a direct correspondence between a data rate and a power level in the lookup table.

The processing unit 202 can adjust the power level of the wireless transceiver of the telecommunications device 102 based at least in part on the WCN data rate, determined at block 302, and the WDN data rate, determined at block 304. The WCN data rate is the limiting threshold, as the wireless transceiver can only transmit as much data as can be passed through the cellular transceiver to the wireless communications network 104. The processing unit 202 determines, based at least in part on the WCN data rate and the WDN data rate, how to adjust the power level of the wireless transceiver to conserve power on the telecommunications device 102. Illustratively, when the WDN data rate and WCN data rate are substantially the same, the power level of the wireless transceiver can be adjusted to match the data rate corresponding to the WCN data rate. The power level of the wireless transceiver can be reduced when the WCN data rate is less than the data rate associated with the power level of the wireless transceiver. For example if the WCN data rate is 4 Mbps and the current power level of the wireless transceiver corresponds to a data rate of 6 Mbps, the processing unit 202 can identify the power level associated with 4 Mbps and adjust the power level of the wireless transceiver accordingly. In another instance, the power level of the wireless transceiver can be increased if the WCN data rate is greater than the data rate associated with the current power level of the wireless transceiver.

The power level of the wireless transceiver can also be adjusted to match the WDN data rate when the WDN data rate is less than the WCN data rate. The power level of the wireless transceiver can be adjusted to transit at a data rate less than the WCN data rate. If the WDN data rate is less than the WCN data rate then the wireless transceiver is using more power than is necessary to transmit data between the telecommunications device 102 and the client devices 106.

In some embodiments the processing unit 202 will have one or more feedback loops or thresholds to monitor the WDN data rate and WCN data rate. The processing unit 202 can update the WDN data rate and WCN data rate using different methods, including periodic updates, threshold-based updates, event-based updates, user-specified updates, and/or a combination of methods. Periodic updates to the WDN data rate and WCN data rate can be at a specific frequency, such as every 100 milliseconds, every second, every 5 seconds, or other frequency. The threshold-based updates can be based at least in part on changes to the WCN operating conditions, the WDN operating conditions, or both. When the conditions change enough to satisfy a specific threshold, the processing unit 202 can update the WDN data rate, the WCN data rate, or both. The event-based thresholds can include events such as a client device connecting or disconnecting from the wireless network.

In some embodiments, when the processing unit 202 determines that there are no client devices 106 connected to the wireless data network 108, in other words, there is no network activity, the processing unit 202 can substantially reduce the power level of the wireless transceiver, change the mode of the wireless transceiver to a sleep mode, or turn off the wireless transceiver; and thus, save battery life in the telecommunications device 102. The processing unit 202 can reactivate the wireless transceiver if client devices 106 are detected. In some embodiments the client devices can be paired with or otherwise preconfigured to communicate with the telecommunications device 102, such as near field communications, and can send a wakeup call that reactivates the wireless transceiver. After the wireless data network is activated, the processing unit 202 can adjust the power level of the wireless transceiver according to the methods discussed herein.

At block 308, the telecommunications device 102 can notify a user of the power level adjustment. Block 308 is optional step of routine 300. The processing unit 202 can provide a notification to a user of the telecommunications device 102 that the power level of the wireless transceiver is being adjusted. In some embodiments, the telecommunications device 102 will have a plurality of configuration options that will allow the user to determine the frequency and notifications that the user prefers. In some embodiments, the user can disable the power saving functionality and always have the wireless transceiver operating at full power. In some embodiments the power level can be adjusted without notifying the user.

Figure 4:
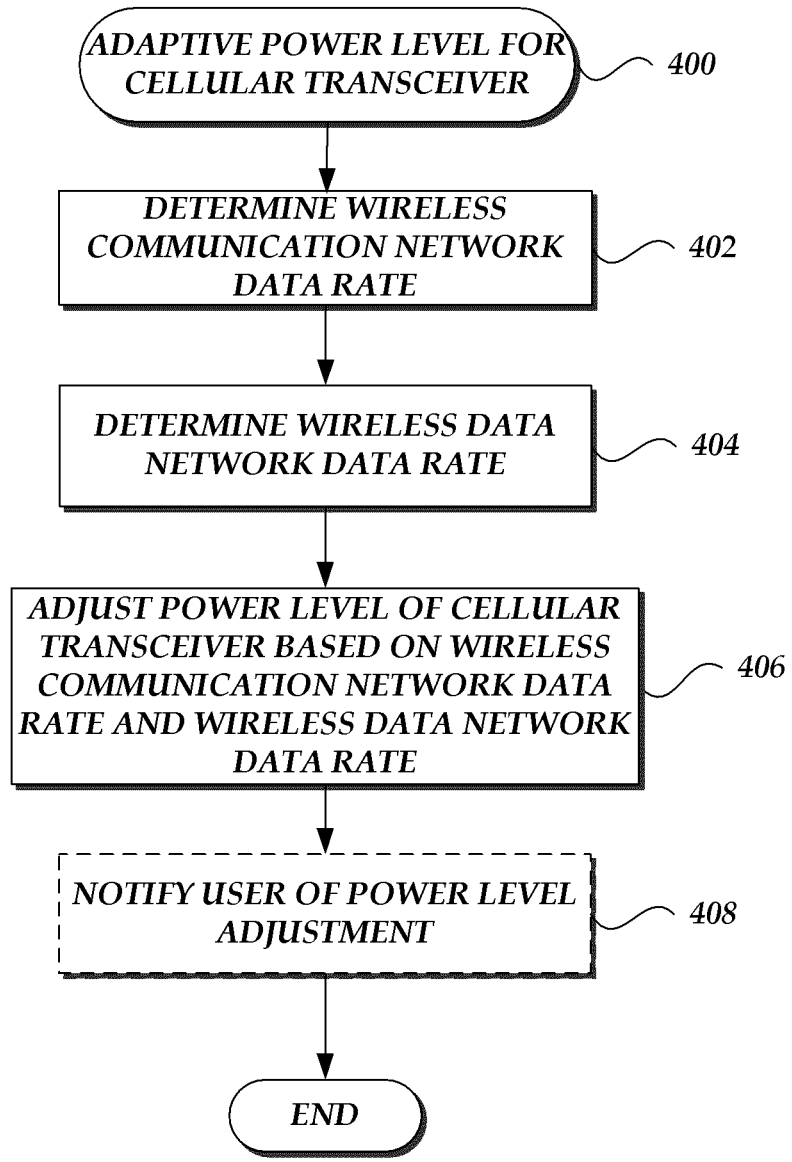
FIG. 4 is a flow diagram depicting an illustrative routine for adapting a power level for a cellular transceiver in a mobile device.

FIG. 4 is a flow diagram depicting an illustrative routine 400 for adapting a power level for a wireless transceiver in a mobile device. One skilled in the relevant art will appreciate routine 400 may be implemented by one or more program modules 208 executed by the processing unit 202 of the telecommunications device 102. Accordingly, the routine 400 has been logically associated as being generally performed by the processing unit 202, and thus the following illustrative embodiments would not be considered as limiting.

At block 402 the processing unit 202 processes the WCN conditions for the wireless communication network 104 and determines a WCN data rate for the wireless access point. In one embodiment, the configuration and process for block 402 is the same as the configuration and process described in relation to block 302.

At block 404, the processing unit 202 determines a WDN data rate. The configuration and process for block 404 is the same as the configuration and process described in relation to block 304.

At block 406, the processing unit 202 adjusts the power level of the cellular transceiver of the telecommunications device 102 based at least in part on the WCN data rate and the WDN data rate. As such, the power level of the wireless transceiver can be used to adjust the effective WDN data rate. The effective WDN data rate determines the maximum data rate at which data can be transferred between the client devices 106 and the telecommunications device 102. For each power level, the cellular transceiver has a maximum data rate. The processing unit 202 can determine the current power of the cellular transceiver and identify the data rate associated with the power level. The power level and corresponding data rates can be identified using a lookup table. The resolution of the lookup table can vary. In some embodiments, the lookup table can have a very fine resolution so that the data rate can be determined within a small margin of precision based at least in part on the power level. In other embodiments, the power levels can represent a range of values. For example, one embodiments of a lookup table can associate data rates with power values at a resolution of 0.1 dB and another lookup table can associated data rates with power levels at a resolution of 1 dB. In some embodiments the processing unit 202 can determine the power level associated with a specific data rate by interpolation when there is not a direct correspondence between a data rate and a power level in the lookup table.

The processing unit 202 can adjust the power level of the cellular transceiver based at least in part on the WCN data rate, determined at block 402, and the WDN data rate, determined at block 404. The WCN data rate is the limiting threshold, as the wireless transceiver can only transmit as much data as can be passed through the cellular transceiver to the wireless communication network 104. The processing unit 202 determines based at least in part on the WCN data rate and the WDN data rate how to adjust the power level of the cellular transceiver to conserve power on the telecommunications device 102, and thus, extend battery life in the telecommunications device 102. Illustratively, when the WDN data rate is lower than the WCN data rate, the power level of the cellular transceiver can be adjusted to match the data rate corresponding to the WDN data rate. For example, if the WDN data rate is 2 Mbps and the current power level of the cellular transceiver corresponds to a data rate of 3 Mbps, the processing unit 202 can identify the power level associated with 2 Mbps and adjust the power level of the cellular transceiver accordingly. In another instance, the power level of the cellular transceiver can be reduced if the WCN data rate is less than the data rate associated with the current power level of the cellular transceiver.

In some embodiments the processing unit 202 of the telecommunications device 102 will have one or more feedback loops or thresholds to monitor the WDN data rate and WCN data rate. The processing unit 202 can update the WDN data rate and WCN data rate using different methods, including periodic updates, threshold-based updates, event-based updates, user-specified updates, and/or a combination of methods. Periodic updates to the WDN data rate and WCN data rate can be at a specific frequency, such as every 100 milliseconds, every second, every 5 seconds, or other frequency. The threshold-based updates can be based at least in part on changes to the cellular network operating conditions, the wireless network operating conditions, or both. When the conditions change enough to satisfy a specific threshold, the processing unit 202 can update the WDN data rate, the WCN data rate, or both. The event-based thresholds can include events such as a client device connecting or disconnecting from the wireless network.

In some embodiments, when the processing unit 202 determines that there are no client devices 106 connected to the wireless data network 108, in other words, there is no network activity, the processing unit 202 can substantially reduce the power level of the wireless transceiver, change the mode of the wireless transceiver to a sleep mode, or turn off the wireless transceiver. The processing unit 202 can reactivate the wireless transceiver if client devices 106 are detected. In some embodiments the client devices can be paired with or otherwise preconfigured to communicate with the telecommunications device 102, such as via near field communications, and can send a wakeup call that reactivates the wireless transceiver. After the wireless network is activated, the processing unit 202 can adjust the power level of the cellular transceiver according to the methods discussed herein.

At block 408, the telecommunications device 102 can provide a notification that the power level has been adjusted. Block 408 is an optional step of the routine 400. The processing unit 202 can provide a notification to a user of the telecommunications device 102 that the power level of the cellular transceiver is being adjusted. In some embodiments the telecommunications device 102 will have a plurality of configuration options that will allow the user to determine the frequency and notifications that the user prefers. In some embodiments, the user can adjust the power saving functionality and always have the cellular transceiver operating at full power. In some embodiments the power level can be adjusted without notifying the user.

In some embodiments the method of adaptively adjusting the power level of the wireless transceiver disclosed in association with FIG. 3 and the method of adaptively adjusting the power level of the cellular transceiver disclosed in association with FIG. 4 can be used together. For example, the power level of the wireless transceiver and the power level of the cellular transceiver can be dynamically adjusted to match the lower value of the WDN data rate and the WCN data rate. The processing unit 202 could keep the power levels and at the lowest possible levels and still attempt to optimize performance based at least in part on the WCN operating conditions and the WDN operating conditions.

Figure 5:
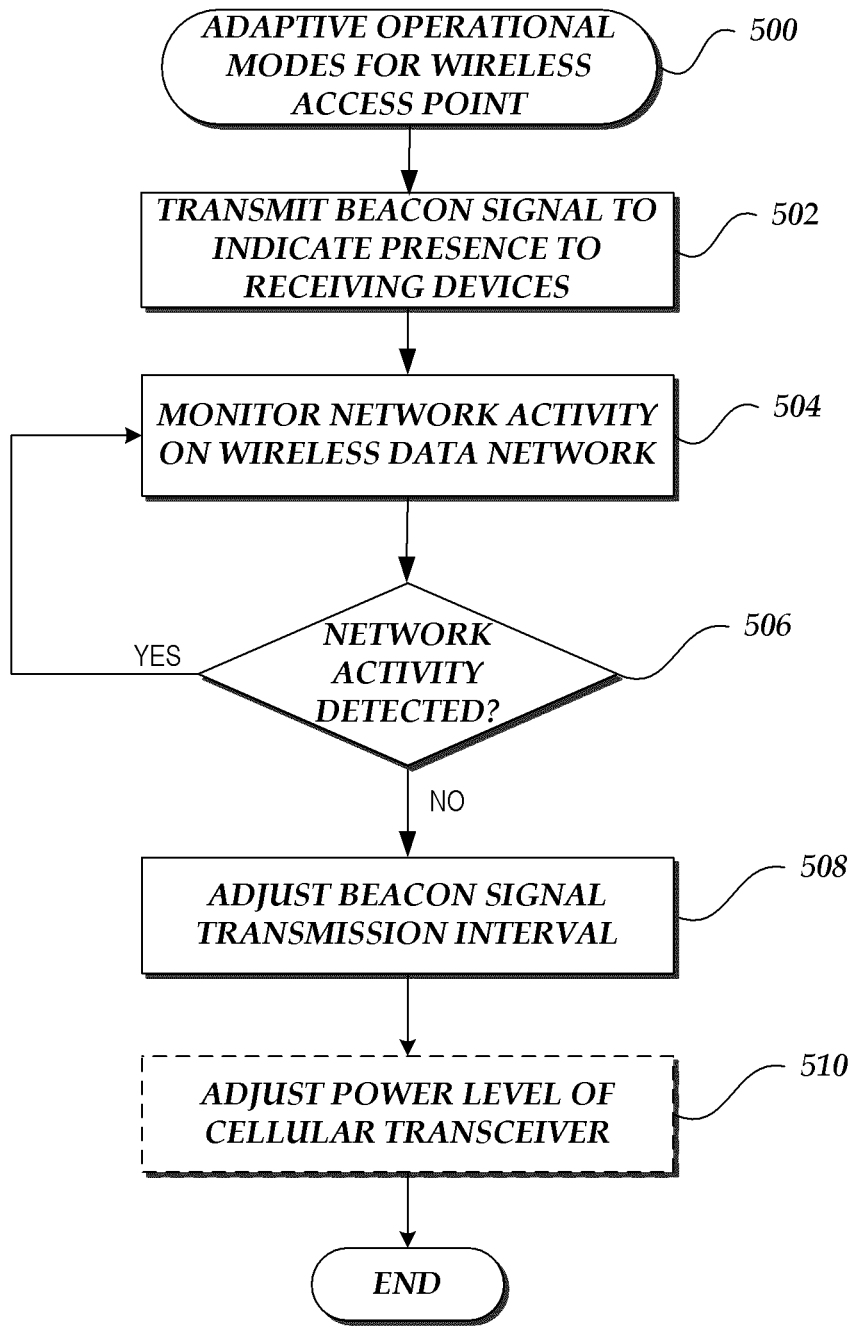
FIG. 5 is a flow diagram depicting an illustrative routine for adapting operational modes for a wireless access point

FIG. 5 is a flow diagram depicting an illustrative routine 500 for adaptive operational modes for a wireless access point. One skilled in the relevant art will appreciate that routine 500 may be implemented by one or program modules 208 executed by the processing unit 202 of the telecommunications device 102. Accordingly, the routine 500 has been logically associated as being generally performed by the processing unit 202, and thus the following illustrative embodiments would not be considered as limiting.

At block 502 the wireless access point device 102 transmits a beacon signal to indicate the presence of the access point to client devices 106. Wireless access point devices such as telecommunications device 102 that are not actively being used do not need to be operated at full power and battery life can be an important consideration. The telecommunications device 102 can implement one or more power management modes, such as sleep mode, power-up mode, active mode, or other mode, in order to conserve power when there is no information to send or receive. In one embodiment the telecommunications device 102 can use beacon signals to save power. Beacon signals are periodic broadcasts by an access point (e.g., every 100 milliseconds). The beacon signals advertise the presence of the access point to clients and carry system parameters, such as the identifier of the access point, the time, how long until the next beacon, and security settings. The beacon signals can be sent at full power.

At block 504 the processing unit 202 monitors network activity on the wireless data network 108. The processing unit 202 can identify how many client devices 106 are connected, the data usage of each client device 106 connected to the wireless data network 108, the aggregate bandwidth of the client devices 106, and other network characteristics. The processing unit 202 can determine the amount of time between communications of the client devices 106. The processing unit 202 can store the network activity information in a data store.

At determination block 506, the processing unit 202 determines whether activity has been detected on the wireless data network 108. The processing unit 202 can use various parameters and thresholds to determine whether any devices are actively using or connected to the wireless data network 108. The determination can be based at least in part on whether a client device 106 is connected to the wireless data network 108, the amount of time since a client device 106 was detected, how long it has been since network activity has occurred, and other conditions. In one embodiment, the network activity is considered detected if the network activity occurred within a specific time window. The processing unit 202 can check for network activity at the end of each time window. Depending on the length of the time window, multiple time windows may be analyzed to determine whether network activity has occurred. If the processing unit 202 determines that network activity has occurred then the processing unit 202 continues monitoring activity on the network. If the processing unit 202 determines that no network activity has occurred then the processing unit 202 can adjust the beacon signal transmission interval.

At block 508, the processing unit 202 adjusts the beacon signal transmission interval if no activity has been detected on the wireless data network 108. The beacon interval can be adjusted to save power. The transmission frequency of the beacon signal can be decreased. For example the beacon signal could be transmitted every 500 milliseconds, or every second rather than every 100 ms. In some embodiments, processing unit 202 changes the operational mode of the access point device. For example, the telecommunications device 102 can be changed to a second mode, such as a sleep or low power mode. The beacon signal can have different transmission protocols for different operational modes or operational characteristics. In some embodiments the frequency of transmission can ramp down over a period of time. For example, when no network activity is initially detected the frequency of transmission can ramp down from 100 milliseconds per signal to a signal every second over a period of two minutes. The beacon signal can continue to transmit the beacon signal at a reduced frequency. After reducing the frequency the processing unit 202 can continue to monitor the wireless data network 108 for activity. When a device is detected on the wireless data network 108, the beacon signal transmission frequency can be increased.

At block 510, the processing unit 202 adjusts the power level of the cellular transceiver of the telecommunications device 102. Block 510 is an optional step. The processing unit 202 can also adjust the power level of the cellular transceiver when the wireless access point device is operating in a sleep or low power operational mode. In some embodiments, the power level of the cellular transceiver can be reduced dependant upon operating functions and characteristics of the telecommunications device 102, such as when the device is a mobile phone. In some embodiments, the cellular transceiver can be deactivated or turned off. For some wireless access point devices, the only function is to form a wireless data network 108. When the wireless data network 108 is not in use by a client device, the telecommunications device 102 does not need to connect to the wireless communication network 104 and the cellular transceiver can be deactivated without impacting the performance of the telecommunications device 102 as an access point device. The cellular transceiver can be reactivated when a client device 106 is detected by the beacon signal. In some embodiments, a client device 106 can send a wakeup signal to the telecommunications device 102 to reactivate the cellular transceiver.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be performed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for power management, the computer-implemented method comprising:
    communicating, by a mobile device, with a cellular network via a cellular transceiver;
    communicating, by a mobile device, with at least one client device via a wireless data network, wherein access to the wireless data network is provided by the mobile device via a wireless transceiver, wherein the wireless data network is a non-cellular network, wherein data is communicated between the cellular network and the wireless data network via the mobile device;
    determining a cellular condition of the mobile device associated with communication between the mobile device and the cellular network;
    determining a cellular network data rate for the mobile device based at least in part on the cellular condition, wherein the cellular network data rate is between the mobile device and the cellular network;
    determining a wireless data network data rate of the at least one client device communicating with the mobile device, wherein the wireless network data rate is between the mobile device and the at least one client device over the wireless data network;
    comparing the cellular network data rate with the wireless data network data rate;
    based on the determination that the cellular network data rate exceeds the wireless data network data rate,
        determining a power level for the cellular transceiver corresponding the wireless data network data rate; and
        adjusting a cellular transceiver power level to the determined power level.

2. The computer-implemented method of claim 1, further comprising:
    based on the determination that the wireless data network data rate exceeds the cellular network data rate,
    determining a power level for the wireless transceiver corresponding to the cellular network data rate; and
    adjusting a wireless transceiver power level to the determined power level.

3. The computer-implemented method of claim 1, wherein the cellular network data rate comprises a predictive data rate.

4. The computer-implemented method of claim 1, wherein the cellular network data rate is based at least in part on time of day.

5. The computer-implemented method of claim 1, wherein the cellular network data rate is based at least in part on a movement speed of the mobile device.

6. The computer-implemented method of claim 2, further comprising:
    detecting a change in the wireless data network data rate; and
    adjusting the power level of at least one of the wireless transceiver or the cellular transceiver to account for the change.

7. The computer-implemented method of claim 1, further comprising:
    detecting a change in the cellular network data rate; and
    adjusting the power level of at least one of the wireless transceiver and the cellular transceiver to account for the change.

8. The computer-implemented method of claim 1, wherein the cellular condition comprises a channel quality index.

9. The computer-implemented method of claim 1, wherein the cellular condition comprises a fading index.

10. The computer-implemented method of claim 1, wherein the cellular network data rate is an uplink data rate.

11. The computer-implemented method of claim 1, wherein the cellular network data rate is a downlink data rate.

12. A mobile telecommunications device comprising:
    a cellular transceiver configured to communicate with a cellular network;
    a wireless transceiver configured to provide a wireless data network, wherein the wireless data network is a non-cellular network, wherein data is communicated between the cellular network and the wireless data network via the mobile telecommunications device; and
    a processing unit in communication with memory and a network interface, the processing unit configured to:
        communicate, over the wireless data network, with at least one client device via the network interface;
        determine a cellular condition;
        determine a cellular network data rate based at least in part on the cellular condition, wherein the cellular network data rate is between the mobile device and the cellular network;
        determine a wireless data network data rate of communication between the at least one client device and the mobile communications device, wherein the wireless network data rate is between the mobile device and the at least one client device over the wireless data network;
        compare the cellular network data rate with the wireless data network data rate;

based on the determination that the cellular network data rate exceeds the wireless data network data rate,
determine a power level for the cellular transceiver corresponding the wireless data network data rate; and
cause adjustment of a cellular transceiver power level to the determined power level.

13. The mobile telecommunications device of claim 12, wherein the mobile telecommunications device is battery powered.

14. The mobile telecommunications device of claim 13, wherein the processing unit is further configured to:
based on the determination that the wireless data network data rate exceeds the cellular network data rate,
determine a power level for the wireless transceiver corresponding to the cellular network data rate; and
adjust a wireless transceiver power level to the determined power level.

15. The mobile telecommunications device of claim 12, wherein the wireless data network is a wireless data network based on the family of IEEE 802.11 technical standards.

16. The mobile telecommunications device of claim 12, wherein the processing unit causes an increase in the power level of the cellular transceiver.

17. The mobile telecommunications device of claim 12, wherein the processing unit causes a decrease in the cellular transceiver power level.

* * * * *